United States Patent [19]

Imoto et al.

[11] Patent Number: 4,765,140

[45] Date of Patent: Aug. 23, 1988

[54] PIEZOELECTRIC SERVOMECHANISM APPARATUS

[75] Inventors: Yuzo Imoto, Kariya; Yoshiyuki Hattori, Toyoake; Toshihiro Takei; Mitsuo Inagaki, both of Okazaki, all of Japan

[73] Assignees: Nippondenso Co., Ltd., Kariya; Nippon Soken, Inc., Nishio, both of Japan

[21] Appl. No.: 816,052

[22] Filed: Jan. 3, 1986

[30] Foreign Application Priority Data

Jan. 17, 1985 [JP] Japan .................................. 60-5040

[51] Int. Cl.$^4$ ............................................. F15B 7/00
[52] U.S. Cl. ........................................ 60/545; 60/503; 60/593; 91/460; 310/328
[58] Field of Search .................... 60/545, 583, 593; 91/460; 310/328; 188/72.1

[56] References Cited

U.S. PATENT DOCUMENTS

| 3,500,799 | 3/1970 | Benson | 91/460 |
| 4,143,514 | 3/1979 | Leiber | 60/545 |
| 4,423,347 | 12/1983 | Kleinschmidt et al. | 310/355 |
| 4,510,412 | 4/1985 | Suda et al. | 310/328 |
| 4,629,039 | 12/1986 | Imoto et al. | 310/328 |

FOREIGN PATENT DOCUMENTS

| 58-152161 | 9/1983 | Japan . | |
| 2087660 | 5/1982 | United Kingdom | 310/328 |
| 640385 | 12/1978 | U.S.S.R. | 310/328 |

Primary Examiner—A. Michael Chambers
Attorney, Agent, or Firm—Cushman, Darby & Cushman

[57] ABSTRACT

A floating plate is provided in a cylinder chamber and slides freely like a piston. A first group of laminated, ring-shaped, thin-plate piezoelectric elements is provided between a fixed support member provided on part of a wall portion of this cylinder chamber and the floating plate. A second group of laminated, cylindrical, thin-plate piezoelectric elements is provided in the center of the first group and a working member is provided on the free end of the second group of elements that is not attached to the floating plate. A hydraulic chamber is formed in the cylinder chamber on the side of the floating plate opposite to the side on which the first and second groups of elements are provided, and the pressure in this hydraulic chamber pushes the floating plate in the direction of the fixed support member. Voltage is applied to the first and second groups of elements to expand and contract them thereby varying the distance between the floating plate and the fixed support member and varying the distance between the floating plate and the working member.

13 Claims, 4 Drawing Sheets

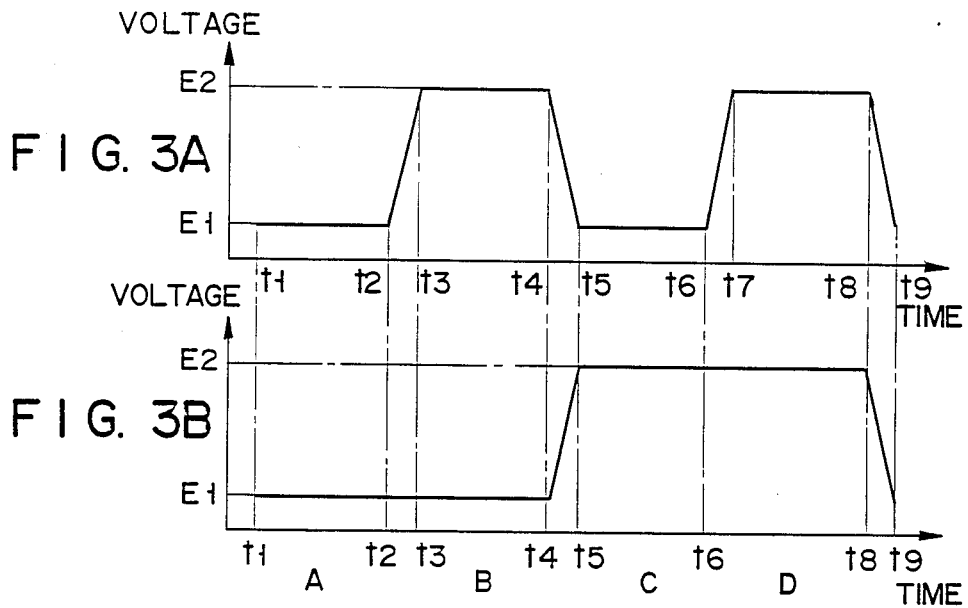
FIG. 3A
FIG. 3B
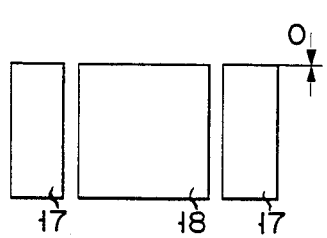
FIG. 4A
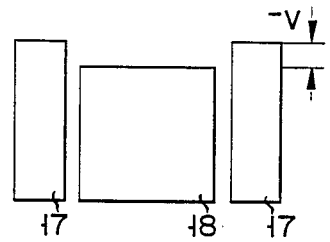
FIG. 4B
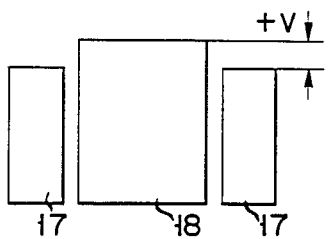
FIG. 4C
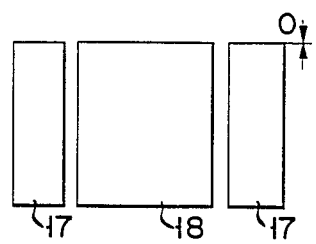
FIG. 4D F I G. 5
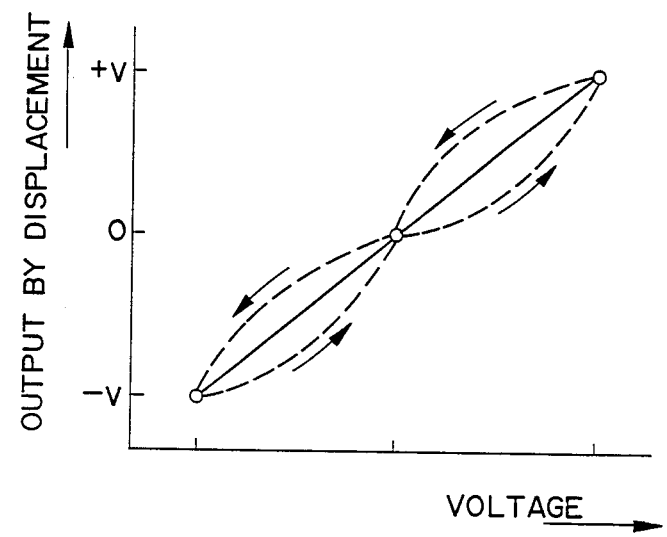

PIEZOELECTRIC SERVOMECHANISM APPARATUS

BACKGROUND OF THE INVENTION

This invention relates to a servomechanism that uses piezoelectric elements and that may be used in the piston mechanism for controlling the fluid pressure in the wheel cylinder of a vehicle braking apparatus, the driving mechanism for a fluid pressure control valve, or for the drive mechanism of an injection valve, etc.

Piezoelectric elements vary in volume with the application of a voltage and this property has been used in various applications as the driving force in mechanical apparatuses. In particular, since these piezoelectric elements have a low thermal expansion coefficient and generate a large mechanical force, their use has been proposed for the drive mechanism of fuel injection valves in the severe conditions found in automobile engines, as shown in Japanese Patent Disclosure 58-152161.

However, these piezoelectric elements are used in combination with other members such as a valve member for opening and closing the fuel passage in a fuel injection valve so that while the thermal expansion characteristics of the element itself may be good, the characteristics of the other members in the device will have a strong influence on its operation. For example, if there is a large difference in the thermal expansion coefficients of the piezoelectric elements and the other members, there will be a large difference in the amount of displacement making it difficult to produce a displacement in the working member corresponding to the displacement of the piezoelectric element.

The relationship between the voltage applied to the piezoelectric element and the mechanical displacement has a large hysteresis feature and, accordingly, the amount of displacement obtained by the application of a particular voltage value cannot be readily determined, making accurate control of the displacement based on voltage alone difficult. It is, for example, very difficult to precisely control the degree of opening of a valve.

Furthermore, the relationship between the thickness of the elements, which are formed of laminated plates, and the amount of displacement obtained from the application of a given voltage is set, so with small piezoelectric elements a sufficient displacement cannot be obtained even with the application of a large voltage. It is, accordingly, difficult to obtain sufficient mechanical displacement to drive the valve plug in a hydraulic control valve, for example.

SUMMARY OF THE INVENTION

The object of the invention is to provide a piezoelectric servomechanism in which low displacement piezoelectric elements are made to produce a displacement amount large enough to drive the valve plug in a control valve, for example.

It is another object of the invention to provide a piezoelectric servomechanism which ensures normal operation even if the thermal expansion coefficients of the piezoelectric elements and the other members of the device are very different and even if there are large changes in temperature.

It is another object of the invention to provide a piezoelectric servomechanism which can provide a displacement amount accurately corresponding to the voltage, which can amplify the displacement of the piezoelectric elements to drive the working member, and which can accurately transmit the displacement of the piezoelectric elements to the working elements.

In this invention it is possible to use the piezoelectric servomechanism for the drive mechanism of a control valve and for a braking control apparatus, etc.

In the servomechanism of this invention, there are first and second groups of piezoelectric elements each comprising a plurality of laminated thin-plate piezoelectric elements. One end of each of the first and second group is attached to a parallel floating plate 13 and the other end of the first group is pressed against a fixed support plate. In this state the free end of the second group of piezoelectric elements drives the working member.

A voltage is applied to the first and second group of piezoelectric elements to expand and contract them. When the first group is expanded or contracted, the floating plate moves in relation to the fixed support plate by the amount of the piezoelectric displacement, and when the second group is expanded or contracted, the working member is driven in relation to the floating plate. In other words, the expansion and contraction of the first and second groups of piezoelectric elements have opposite effects on the working member. Also, by applying opposite voltage levels to the first and second groups, it is possible to produce a large driving force. By so controlling the voltages for the two groups of elements, the displacement of the working member can be controlled. In this case, the application of voltage to the first and second group results in an opposite action in the working member so the hysteresis characteristic in the mechanical displacement action of the piezoelectric elements is cancelled and the action can be very accurately controlled.

The working member is controlled in relation to the fixed plate so the different thermal expansion coefficients of the structural elements as compared to the piezoelectric elements does not affect the amount of displacement of the working member. Accordingly, even when this apparatus is used in atmospheres having severe temperature changes, it can be accurately controlled and can be readily constructed for use in devices relating to engines, e.g., fuel injection valves, or for piston mechanisms in braking apparatuses.

BRIEF DESCRIPTION OF THE DRAWINGS

FIGS. 3A and 3B are timing charts of the first and second groups shown in FIG. 2 for when a voltage is applied;

FIGS. 4A to 4D show the amount of displacement of the working member in correspondence to the expansion and contraction of the first and second groups when the voltages shown in FIG. 3 are applied;

FIG. 5 shows the relationship between the voltage applied to the apparatus and the amount of displacement of the working member.

DETAILED DESCRIPTION OF THE PREFERRED EMBODIMENTS

Figure 1:
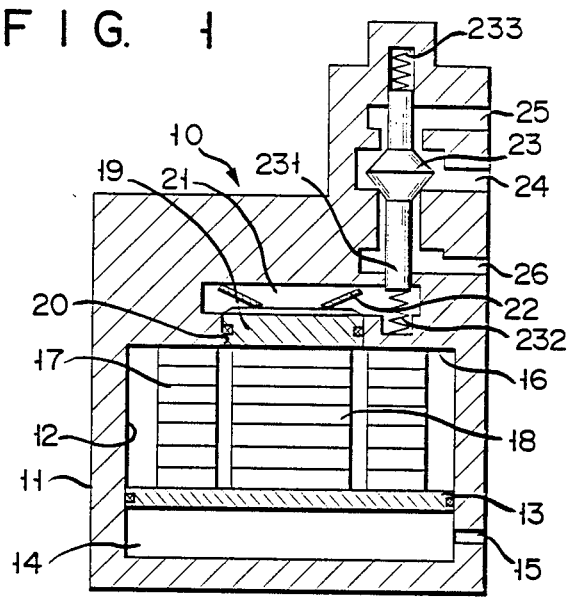
FIG. 1 is a cross-section of a control valve which uses the piezoelectric servomechanism according to the first embodiment of the invention.

FIG. 1 shows a control valve 10, which is located in the fluid passage of a vehicle braking system with cylinder 12 formed in housing 11. Floating plate 13, which is provided in cylinder 12, moves inside the cylinder along its axis like a piston and forms hydraulic chamber 14. Fluid is normally supplied from a source (not shown) to hydraulic chamber 14 via port 15 to exert an upward force on floating plate 13.

Fixed support member 16 is provided on the side of cylinder 12 opposite hydraulic chamber 14 and is a part of the wall forming cylinder 12. Fluid supplied to hydraulic chamber 14 forces floating plate 13 in the direction of fixed support member 16.

The first group of piezoelectric elements 17 constructed of a plurality of laminated thin-plate piezoelectric elements and a similarly constructed second group of piezoelectric elements 18 are attached to floating plate 13 on the side opposite to that facing hydraulic chamber 14. The end of first group 17, which is on the side opposite to the floating plate 13, abuts against fixed support member 16 so the distance between floating plate 13 and support member 16 is determined by first piezoelectric element group 17.

Figure 2:
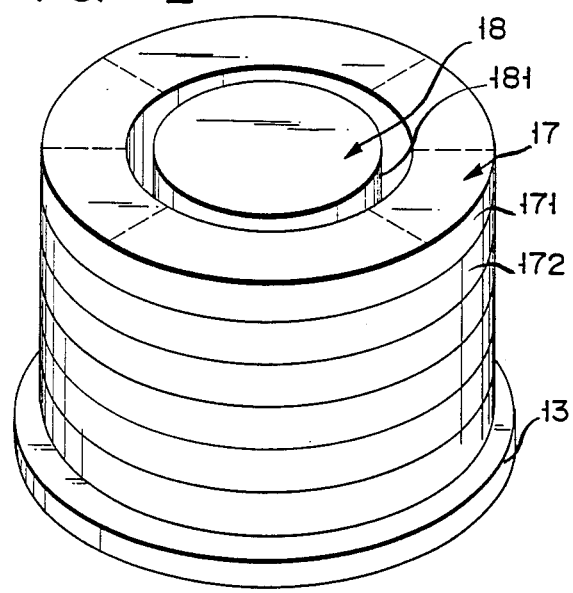
FIG. 2 is an expanded perspective view of the first and second piezoelectric element groups which are a part of the apparatus of FIG. 1.

The first and second groups 17, 18 are constructed as shown in FIG. 2. Floating plate 13 is circular and corresponds to the inner surface of cylinder 12, and first group 17, which is attached to it, is ring-shaped. First group 17 is constructed of a plurality of laminated, thin-plate, ring-shaped piezoelectric elements 171, 172, . . . and is provided on floating plate 13. Details are not shown in the diagram, but this laminated structure is covered with an elastic sheet to form an integral unit. Electrode plates are interposed between the piezoelectric elements so that they are connected in parallel. When the voltage is at a high level the piezoelectric elements 171, 172, . . . expand and when the level is low they contract.

The second group of piezoelectric elements 18 is cylindrical in shape and is provided inside the second group of piezoelectric elements 17 as a sort of round post. Second group 18 is also constructed of a plurality of round, thin-plate piezoelectric elements 181, . . . in between which electrode plates are interposed to connect the elements in parallel. This second group of piezoelectric elements 18 works in the same manner as the first group 17. The first and second group 17, 18 are displaced in the same direction, and adhesive need not be applied between floating plate 13 and between the individual piezoelectric elements of both groups 17, 18 because pressure from hydraulic chamber 14 acts on floating plate 13 to keep all the elements together.

Working member 19 is provided on the free end of second group 18 on the side opposite floating plate 13. This working member 19, which may be a cylindrical piston, for example, moves in cylinder 20 formed coaxially with cylinder 12, which in turn is formed in the central part of fixed support member 16. Cylinder 20 communicates with hydraulic chamber 21 and is biased against second group 18 by spring 22.

Piston 231, which is formed integral with valve plug 23, is inserted into hydraulic chamber 21. Valve plug 23 is held in equilibrium by springs 232 and 233 and is movable in a direction coaxial with piston 231 so that it can switch between two positions depending on the pressure from hydraulic chamber 21. When working member 19 is pushed into hydraulic chamber 21, valve plug 23 moves upward in the drawing. By moving between these two positions, valve plug 23 opens either of two passages 25, 26 for supplying a fluid such as brake fluid from passage 24, for example.

If a voltage which varies between a low voltage E1 or a high voltage E2, as is shown in FIGS. 3A and 3B, is applied to the two groups of elements 17, 18, working member 19 will be displaced as follows. First, as shown in FIG. 4A, between time t1 and t2, the two groups of elements contract so that the amount of displacement is 0, and the groups are in the reference position. Between the time t3 and t4, a high voltage E2 is applied to only first group 17 and, accordingly, only first group 17 expands as is shown in FIG. 4B, so second group 18 is shorter than first group 17 and working member 19 moves so as to decrease the pressure in hydraulic chamber 21. This displacement amount is $-v$.

Between the time t5 and t6, a high voltage is applied to second group 18 instead so that the second group becomes longer than the first group, and, as shown in FIG. 4C, working member 19 is displaced by $+v$. When a high voltage is applied to both the first and second group between the time t7 and t8, the displacement amount of working member 19 is 0, as is shown in FIG. 4D. By so switching between voltages E1 and E2 that are applied to first and second group 17, 18, it is possible to displace working member 19 by twice (2 v) the displacement of one group of piezoelectric elements.

The displacement of working member 19 is the total difference in length of the first and second groups of piezoelectric elements 17, 18. Working member 19 has three different positions $-v$, 0, v. These three positions are determined by the mutual relationship between the voltages applied to the two groups of piezoelectric elements 17, 18 so they are not dependent on their previous displacement. Accordingly, the hysteresis characteristic of the displacement corresponding to changes in the voltage applied to the piezoelectric elements becomes as shown in FIG. 5; i.e., nonexistent. It is therefore possible to use this device as a servomechanism for switching among three positions.

With this kind of apparatus, floating plate 13 moves, in response to expansion of members resulting from changes in temperature, inside cylinder chamber 12, which is formed by housing 11. Accordingly, regardless of the changes in temperature, there is no change in the mutual positional relationship between fixed support member 16 and floating plate 13, and reliable operation characteristics can be obtained even in atmospheres where there are considerable changes in temperature.

Figure 6:
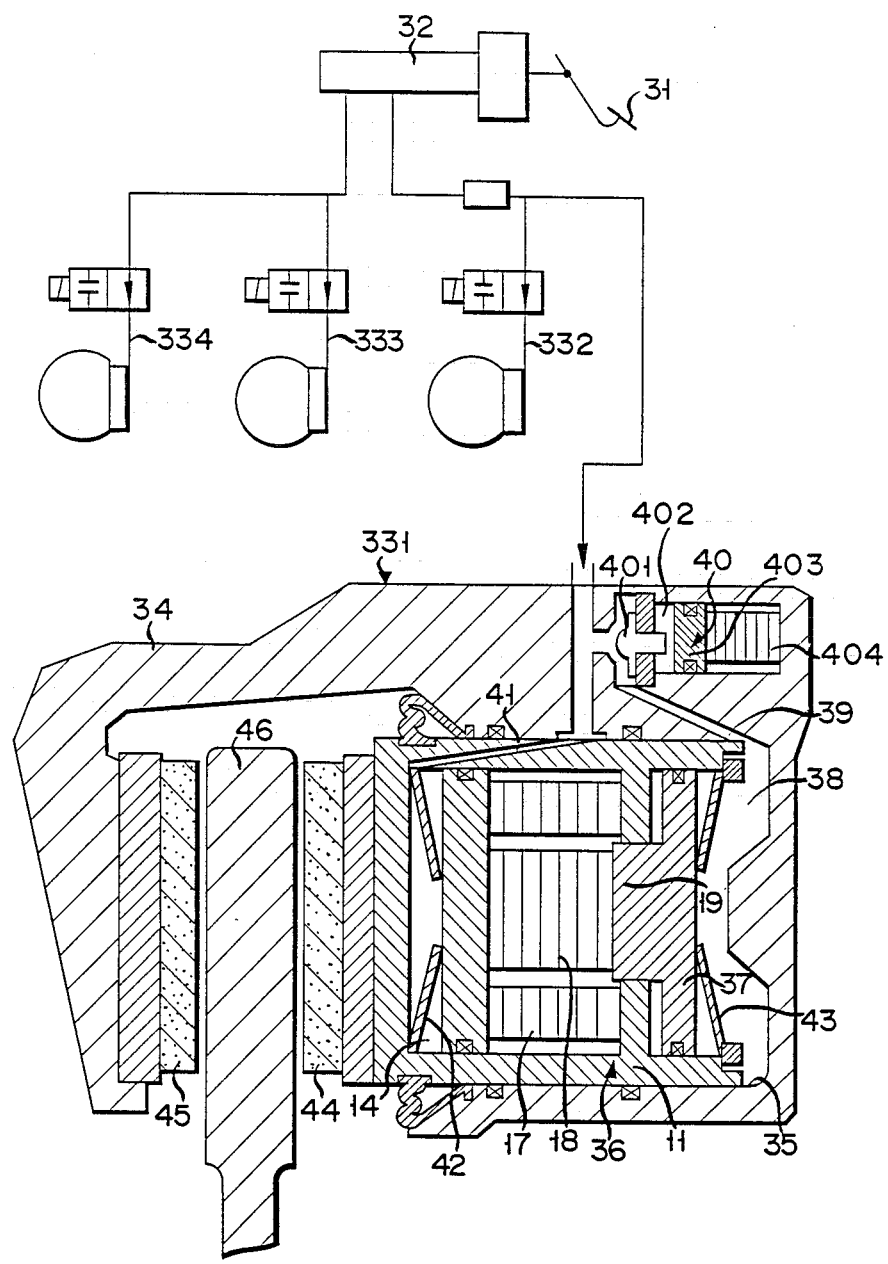
FIG. 6 is a cross section of a braking apparatus which uses the above piezoelectric servomechanism.

In the above embodiment, a control valve was controlled by a piezoelectric device. However, other applications are possible. For example, FIG. 6 shows the effective application of this device to the braking apparatus of a vehicle. In this braking apparatus this device is used for antiskid control.

In this kind of braking control apparatus, brake pedal 31 is pressed and fluid is supplied to braking control apparatuses 331-334 via brake fluid pipes from master cylinder 32. Each braking control device then applies a corresponding amount of pressure to the wheels.

Braking control apparatuses 331-334 all have the same structure, so a description will be given only of apparatus 331.

Braking apparatus 331 comprises brake caliper 34 in which wheel cylinder 35 is formed. Piston 36 is provided in wheel cylinder 35. Brake piston 36 has a structure that corresponds to housing 11 shown in FIG. 1 and in which first and second groups of elements 17, 18 are provided. Working member 19 is driven by second group of elements 18.

Working member 19 is integrally formed with control piston 37, which is provided facing hydraulic chamber 38 of wheel cylinder 35. By controlling the voltage to groups 17 and 18, control piston 37 is driven and the length of brake piston 36 is varied so that it is possible to vary the volume of hydraulic chamber 38.

Fluid is supplied to hydraulic chamber 38 from master cylinder 32 via passage 39 in which control valve 40 is provided. Control valve 40 has a valve plug 401 which closes off and opens passage 39. Valve plug 401 is driven by the pressure of hydraulic chamber 402 to close passage 39 when the pressure rises. The pressure in hydraulic chamber 402 is controlled by piston mechanism 403, which although not shown in this drawing, has the same structure as the first and second group of elements 17, 18 shown in FIGS. 1 and 2. Any structure in which, when a high voltage is applied to the elements, they expand and the pressure in hydraulic chamber 402 rises, is acceptable.

The fluid from master cylinder 32 is supplied via passage 41 to hydraulic chamber 14, which forms the servomechanism. Springs 42 and 43 are provided on the surfaces of floating plate 13 and control piston 37 to maintain the position of the first and second groups of piezoelectric elements 17 and 18. The normal position of the servomechanism, which includes these groups of elements, is inside brake piston 36.

Brake disc 46, which rotates as a unit with the wheel, is located between brake pad 44, which is attached to brake piston 36, and brake pad 45, which is attached to the brake caliper.

Normally, control valve 40 in passage 39 is open and, accordingly, pressure is generated in wheel cylinder 32 by depressing brake pedal 31, and is supplied to wheel cylinder 35. Brake piston 36 is driven by fluid supplied from master cylinder 32 and applies a braking force to the wheels corresponding to the force applied to the brake pedal.

Slippage as a result of the wheels locking can be detected by the change in rotation speed of the wheels. Voltage to the first and second group of piezoelectric elements is controlled based on a wheel-lock detection signal to move control piston 37 as far as possible toward hydraulic chamber 38 and to expand the volume of brake piston 36. In this case, because the fluid in hydraulic chamber 38 of wheel cylinder 35 is supplied from master cylinder 32, there is no change in the braking force.

Then, passage 39, which is connected to hydraulic chamber 38, is closed by control valve 40, and the volume of hydraulic chamber 38 is locked at its present state. When the volume is set in this way, a voltage is once more applied to the first and second groups 17, 18 to drive control piston 37 and decrease the volume of brake piston 36. Accordingly, brake piston 36 then moves toward hydraulic chamber 38 and the pressure of brake pad 44 against brake disc 46 drops so that the wheel unlocks to end the slippage.

When during acceleration more power than necessary is delivered to the wheels and the wheels spin, this braking control apparatus is able to suppress this spinning so that acceleration is smooth. More precisely, what happens is that when spinning is detected during acceleration, the voltage to the first and second group 17, 18 is controlled to contract brake piston 36, and with control piston 37 withdrawn as far as possible from hydraulic chamber 38, control valve 40 closes passage 39. The voltage to first and second group 17, 18 of brake piston 36 is switched to contract it. Then the pressure in hydraulic chamber 38 of wheel cylinder 35 rises and a braking force is exerted on the wheel to suppress the spinning for smooth and efficient transfer of power to the wheels.

In the above description, the first group of piezoelectric elements 17 is constructed of a plurality of ring-shaped piezoelectric elements 171, 172, . . . , but they may also have the divided shape shown by the broken line in FIG. 2. As shown, a plurality of fan-shaped piezoelectric element members are aligned to form the first layer.

When the group of piezoelectric elements is constructed of these fan-shape piezoelectric element members, the construction of the individual elements is simplified and, even if damaged, reliable operation is ensured.

In the preferred embodiment, a servomechanism was constructed in which a cylindrical second group of piezoelectric elements was inserted into the hole of a ring-shaped first group of piezoelectric elements. However other combinations of groups of elements are possible. For example, the groups may both be cylindrical posts that work in combination.

What is claimed is:

1. A piezoelectric servomechanism apparatus, comprising:

a cylinder chamber;

a fixed support member formed at a first axially opposite inner end portion of said cylinder chamber;

a floating plate which moves inside said cylinder chamber in the axial direction of said cylinder chamber;

a first group of piezoelectric elements, which is provided between the fixed support member of said cylinder chamber and said floating plate and which expands and contracts with the application of voltage, said first group of piezoelectric elements being formed by stacking a plurality of thin-plate piezoelectric elements one on another between said fixed support member and said floating plate, for expanding and contracting in a direction in which the elements are stacked;

a second group of piezoelectric elements which is provided on said floating plate and is parallel with said first group of piezoelectric elements, and which expands and contracts in a direction parallel to the direction in which said first group of piezoelectric elements are stacked, said second group of piezoelectric elements being formed by stacking a plurality of thin-plate piezoelectric elements on said floating plate, for expanding and contracting in a direction in which the elements are stacked;

a working member which is provided on a free end of said second group of piezoelectric elements on the side opposite said floating plate;

first urging means for urging said floating plate and said first group of piezoelectric elements against the fixed support member of said cylinder chamber; and second urging means for urging said working member and said second group of piezoelectric elements against the floating plate.

2. An apparatus according to claim 1, wherein said floating plate is provided inside said cylinder chamber to provide inside said cylinder chamber to provide a piston motion, a hydraulic chamber constituting said first urging means is formed on the side of said flating plate that is opposite to where said first and second groups of piezoelectric elements are located, and fluid is supplied to said hydraulic chamber to generate a force that pushes said floating plate toward said fixed support member.

3. An apparatus according to claim 1, wherein said first group of piezoelectric elements is ring-shaped and said second group of piezoelectric elements is cylindrical and is inserted into the center of said first group of piezoelectric elements.

4. An apparatus according to claim 1, wherein said first group of piezoelectric elements is ring-shaped and said second group of piezoelectric elements is cylindrical and is inserted into the center of said first group of piezoelectric elements, said fixed support member being formed by a wall portion having a surface constituting said first axially opposite inner end portion of said cylinder chamber, and said working member being slidably provided on the center portion of said wall portion such that it slides along the axis of said cylinder chamber.

5. An apparatus according to claim 1, wherein the plurality of piezoelectric elements that comprise said first group of piezoelectric elements are divided into a plurality of piezoelectric element members to form a ring shape.

6. An apparatus according to claim 1, further comprising a cylinder formed by a wall portion having a surface constituting a second axially opposite inner end portion of said cylinder chamber, a piston-shaped working member provided in said cylinder, and a hydraulic chamber formed in communication with said cylinder and constituting said second urging means, the fluid pressure in said hydraulic chamber being controlled by the movement of said working member.

7. An apparatus according to claim 6, wherein another cylinder is formed in said hydraulic chamber and a piston device is inserted into said another cylinder, said piston device being driven in correspondence to changes in fluid pressure in said hydraulic chamber caused by movements of said working member.

8. An apparatus according to claim 6, wherein said working member is urged toward said second group of piezoelectric elements by a spring provided in said hydraulic chamber.

9. An apparatus according to claim 7, wherein said piston device is driven integrally with a valve plug which is provided in a fluid passage for opening and closing said passage.

10. A piezoelectric braking control apparatus, comprising:
a wheel cylinder to which fluid is supplied for generating pressure corresponding to a braking operation;
a brake piston provided in said wheel cylinder and driven by the fluid pressure in a hydraulic chamber in said wheel cylinder to apply a braking force;
a control valve for opening and closing a passage for supplying fluid to the hydraulic chamber of said wheel cylinder;
said brake piston comprising:
a cylinder chamber formed coaxially with said piston;
a floating plate which is piston-shaped and slidably provided in said cylinder chamber;
a first group of piezoelectric elements, which are expanded and contracted by the application of voltage, and which are provided between said floating plate and a fixed support member in said cylinder chamber, said first group of piezoelectric elements being formed by stacking a plurality of thin-plate piezoelectric elements one on another between said fixed support member and said floating plate, for expanding and contracting in a direction in which the elements are stacked;
means for urging said floating plate toward said fixed support member;
a second group of piezoelectric elements, which are expanded and contracted by the application of voltage, and which are provided parallel to the direction in which said first group of piezoelectric elements are stacked, said second group of piezoelectric elements being formed by stacking a plurality of thin-plate piezoelectric elements on said floating plate, for expanding and contracting in a direction in which the elements are stacked; and
a control piston, which is provided coaxially with said cylinder chamber and is urged by the fluid pressure in said hydraulic chamber toward said floating plate, for varying the effective length of said brake piston, the gap between said floating plate and said brake piston being varied by said second group of piezoelectric elements, wherein braking force is varied by closing said control valve and varying the effective length of said brake piston.

11. An apparatus according to claim 10, wherein fluid is supplied to said hydraulic chamber in said wheel cylinder via a passage, which is opened and closed by said control valve, from a master cylinder in which pressure corresponding to the operation of a brake pedal is generated.

12. An apparatus according to claim 11, wherein said means for urging said floating plate is constructed in said cylinder chamber of a hydraulic chamber partitioned by said floating plate, fluid being supplied from said master cylinder to said hydraulic chamber in response to the operation of the brake pedal.

13. A piezoelectric servomechanism apparatus, comprising:
a cylinder chamber;
a fixed support member formed in said cylinder chamber at a first axially opposite end portion thereof;
a floating plate which moves inside said cylinder chamber in the axial direction of said cylinder chamber;
a first group of piezoelectric elements, which is provided between the fixed support member of said cylinder chamber and said floating plate and which expands and contracts with the application of voltage, said first group of piezoelectric elements being formed by stacking a plurality of thin-plate piezoelectric elements one on another between said fixed support member and said floating plate, for expanding and contracting in a direction in which the elements are stacked;
a second group of piezoelectric elements which is provided on said floating plate and is parallel with said first group of piezoelectric elements, and which expands and contracts in a direction parallel to the direction in which said first group of piezoelectric elements are stacked, said second group of piezoelectric elements being formed by stacking a plurality of thin-plate piezoelectric elements on said floating plate, for expanding and contracting in a direction in which the elements are stacked;

a working member which is provided on a free end of said second group of piezoelectric elements on the side opposite said floating plate;

first urging means for urging said floating plate and said first group of piezoelectric elements against the fixed support member of said cylinder chamber;

second urging means for urging said working member and said second group of piezoelectric elements against the floating plate; and means for applying a high and low voltage to both said first and second groups of piezoelectric elements and voltage control means for applying a low voltage to either said first or second group of piezoelectric elements and applying a high voltage to the other of said first or second group of piezoelectric elements.

* * * * *